UNITED STATES PATENT OFFICE.

ALADÁR von LÁSZLOFFY, OF PEORIA, ILLINOIS.

MANUFACTURE OF BY-PRODUCTS FROM DISTILLERY-SLOP.

1,147,767. Specification of Letters Patent. Patented July 27, 1915.

No Drawing. Application filed January 30, 1911. Serial No. 605,611.

*To all whom it may concern:*

Be it known that I, ALADÁR VON LÁSZ-LOFFY, subject of Francis Joseph, King of Hungary, residing at Peoria, in the county of Peoria and State of Illinois, have invented certain new and useful Improvements in the Manufacture of By-Products from Distillery-Slop; and I do hereby declare that the following is a full, clear, and exact description of the invention, which will enable others skilled in the art to which it appertains to make and use the same.

This invention relates to a new and useful process for separating a mixture of substances derived from slop into a plurality of groups of by-products.

An object of the invention is to separate the mixture of substances represented in distillery slop into solutions containing glycerin, lactic acid, succinic acid, fats, gums, soluble nitrogenous substances, salts, etc.

Another object of the invention is to carry out the separation of solutions from concentrated slop by a solvent without the addition of substances that would be hurtful to any of the products.

Another object of the invention is to separate the mixture of substances represented in distillery slop into solutions containing the named substances without destroying the value of the slop as a feed, and without diminishing its commercial value as a concentrated cattle-feed.

Another object is to extract said solutions from slop without destroying the feed value of the same whereby the slops can be made to yield greater returns in money value than produced alone by the slop as a feed.

Still another object of the invention is the recovery of any certain by-product or by-products, contained in the slop without destroying others contained therein.

This process is intended for the treatment of slop used as a feed, especially grain,—potato, or sugar-beet slop, but it can also be used for the slop or vinasse derived from other raw materials.

Distillery slop consists of a solution and suspended solids. The solution contains soluble nitrogenous matter, carbohydrates, gums, salts, lactic and succinic acids, glycerin and other substances. Various processes have been devised for extracting by-products, especially glycerin, from the slop and in some of those processes the slop is treated with alcohol in order to obtain said glycerin, but the practice is such that in order to obtain the by-products either the whole slop or the dissolved substances of the same are sacrificed and made unfit for a feed. The slop is of such value as a feed, especially in the case of grain-slop, that the value of the by-products obtained from it by the older methods is not sufficient to warrant destruction of the feed-value even if the solids are removed before the process of extraction begins.

One of the objects of the invention, therefore, and a very important one, is to provide a process by which the dissolved substances contained in the slop can be economically separated into a solid part containing almost all the substances valuable as a feed, and a solution containing the glycerin, the lactic acid and the succinic acid of the slop-solution in a highly concentrated state and without destroying the value of any of the original slop for a feed.

I obtain this separation preferably by concentrating the slop through evaporation, to a syrupy or a pasty consistency, driving off the largest part of the water, afterward treating the material left with alcohol. The alcohol precipitates most of the albumens, dextrins, gums, salts, etc., soluble in water, and the alcoholic solution thus obtained contains the glycerin, lactic and succinic acids as well as the fats. This solution can now be subjected to any chemical treatment necessary to separate the by-products from each other. And by first separating the slop with the aid of alcohol into a feed part and into a solution containing the by-products, the chemicals necessary for obtaining the latter will not come in contact with the substances of the slop which are valuable as a feed. This solution must not be regarded as a mixture containing the named substances only, since there are always nitrogenous substances, small amounts of salts, etc., present in it which may be considered impurities. The manner in which these impurities can be eliminated by repeating the alcohol treatment will be understood later. But the solution containing the by-products obtained from distillery-slop with an alcoholic solvent, does not necessarily contain lactic and succinic acids. Their presence depends upon the treatment the slop receives before it is mixed with the alcoholic solvent. For instance, by neutralizing the slop or by transforming the said acids into salts, which are insoluble in the solvent used, a solution is obtained which contains, together with other substances, glycerin and fat but no acids. Therefore, my process need not necessarily carry with it the simultaneous extraction of the acids and glycerin. I have found that it is both technically and commercially advantageous to treat with the alcoholic solvent without first neutralizing the slop.

By proceeding in the manner described two very important advantages are gained—the soluble substances of the slop are at once divided into a concentrated mixture of lactic acid, succinic acid, glycerin and fat, and into substances valuable as a feed, and a further advantage is that the quality of the feed-residue is not depreciated by the presence of chemicals.

The alcohol not only divides the slop into a soluble and insoluble part but it also leaves the insoluble part in such a physical condition that the mechanical separation of the solids and the solution can be accomplished with the greatest ease, for instance either by settling or filtration. Moreover, the physical condition of the residue of the alcohol separation is such that other by-products can be separated from it such, for instance, as gums, dextrins, soluble albumens, etc., and in this specification the separation of the slop into a solution containing glycerin, organic acids, fats, etc., and into a solid part containing the feed part of the slop, gums, etc., will be referred to as an "alcohol-separation."

I recover the alcohol used for separation by distilling the same off in an alcohol distilling apparatus which will eliminate the water absorbed by the alcohol.

In order to simplify and make clear the explanation of my invention, I desire to state at this time that wherever, in any stage of the process, the recovery of the alcohol or other solvent used in this process is not especially mentioned it is understood that this recovery takes place, for economical reason particularly, in any style of distilling or rectifying apparatus for this purpose.

Having now explained the principles of the invention, a more detailed explanation of the manner of making use of these principles will be given.

The practice may include different methods:—For example, by boiling down the slop as it comes from the still, hulls and all, preferably in vacuum, until the largest part of the water is removed and then treating it with alcohol, or by separating the suspended solids from the aqueous solution of the slop by settling, filtering or by the use of a centrifugal machine, boiling the aqueous solution down to the consistency of a thick syrup preferably in vacuum, and using only the syrup, which contains the largest part of the glycerin, organic acids, gums, and some fat of the slop, for the alcohol separation. Or, again I can separate the suspended solids of the slop by mechanical means, boil the thus obtained aqueous solution to a syrupy consistency, mix the syrup with the solid part of the slop and subject this mixture to the alcohol treatment before or after drying it.

Preferably my process is practised by mixing the solvent with the slop after it has been reduced to a syrupy or even a pasty consistency the albumenous and gummy substances being thereby precipitated.

The process presents some very important advantages in practice of which the most important are that the by-products remain in the slop in a dissolved state and are almost instantaneously incorporated into the alcohol. Losses of lactic acid and glycerin which are unavoidable in drying are practically eliminated. The material can be easily handled, the loss of solvent is very small, and the solvent can be easily recovered.

The removal of the water from the slop before treating the same with alcohol is not an absolute necessity, but more practical. But preferably the alcohol is gradually added to the slop which has been concentrated to a syrupy consistency. This gradual addition of the alcohol allows the slop to become thoroughly mixed with it and when a certain percentage of the latter in the mixture is reached the coagulation of the insoluble substances is in finer particles and the extraction of the soluble substances more complete. I can also make the alcohol-separation a continuous one by running a continuous stream of concentrated slop and alcohol into a mixing vessel wherefrom I can continuously separate the precipitated solids by mechanical means from the solution, and distill the alcohol out of said solution in a continuous manner, and in a continuous manner, also, eliminate the alcohol from the separated solids.

Preferably I use for the alcohol-separation, "ethyl-alcohol," but I can use methyl-alcohol or alcohol to which other substances have been added either as denaturing agents or in order to make certain impurities insoluble in the alcohol. In the latter case I can use either ethyl-alcohol, methyl-alcohol or mixture of either or both with ethyl-ether, fusel-oil, other alcohols, chloroform, tetrachlorid of carbon and other such mixtures in which the alcohol will predominate.

In order to simplify the claims and make them more easily understood I use the term "alcoholic solvent" meaning alcohols as well as the mixtures just enumerated. In the claims, also, when the terms "alcohol-water mixture" or "alcohol and water" is used they will be taken to mean alcohol mixed with water.

The alcohol used for the alcohol separation as well as the mixtures named above can be used at any temperature cold or hot, but preferably I use the hot alcohol in the treatment of the whole slop in order to more easily separate the fats, and in order to obtain the glycerin and the organic acids in a state of higher purity I can repeat the alcohol treatment for further separation, proceeding, for example, in the following manner: recovering the alcohol from the solution resulting from the first alcohol-separation and then boiling such solution until it has a thick syrupy consistency. Now strong alcohol is again added to obtain a new precipitation of impurities which are eliminated by filtering exactly in the same way as in the first instance and preferably in the latter case ethyl-ether of fusel-oil is added to the alcohol.

It has already been stated that the physical condition of the residue of the alcohol-separation is such that other byproducts can be separated from the same as for instance, the gums, soluble albumens, salts, etc. The separation of these substances from the feed part is made more easy by reason of the fact that some of them are found to be soluble in alcohol-water mixtures of a certain strength and this treatment of the residue with gradually weaker solutions of alcohol is an important feature of my invention and admits of separating a variety of different substances from the slop. For example, by adding water to the residue of the alcohol-separation, which naturally contains a large percentage of alcohol I can get practically all of the gums in solution and after recovering the alcohol and evaporating the water the gums are left.

Finally, the treatment of the residue is to be explained.

As can be readily seen from the foregoing, the methods employed in obtaining this residue are such that the said residue is in no way depreciated as a commercial cattle-feed. No injurious chemicals whatsoever have been used and the residue is made to contain a larger proportion of the true protein-substances by the separation of the by-products enumerated, and this is a very important advantage indeed. But still another advantage is derived by eliminating the organic acids, the glycerin and other substances from the syrupy slop since the latter then loses its sticky and gummy character. The concentrated liquid part of the slop reduced to a syrup cannot be successfully dried until the organic acids and the glycerin, etc., are extracted by the present process. The residue of extraction is therefore either dried alone or by its admixture with absorbent material, for instance, the solid part of the slop.

The following is an example of the preferred mode of practising my invention. For instance, corn-slop to the amount of 30,000 gallons is separated on filter presses into solid cakes, and the thin slop flowing from the filter-presses is concentrated by boiling it on a multiple effect vacuum evaporator for instance until it has attained the consistency of a thick syrup and represents a bulk of about 800 gallons which is now subjected to the desired treatment after placing it in a closed vessel provided with a stirrer, by adding gradually to it 2400 gallons of alcohol of 190° proof. The concentrated slop is thoroughly mixed with the alcohol and after a few minutes the coagulation of the substance insoluble in alcohol takes place. I run the mixture now into a second closed tub provided with a perforated false bottom and the alcohol-solution is allowed to filter out. After the flow of the alcoholic solution has ceased I wash the residue with 800 gallons of alcohol which is added to the solution just run off.

The solution thus obtained is now run into a distilling apparatus and after the alcohol is distilled off, a thick syrup is left representing a concentrated solution of glycerin and organic acids together with a percentage of fat and impurities. The treatment of this syrup will be described later attention being directed at this time to treatment of the residue of the alcohol-separation left in the tub. This naturally contains much alcohol and the gums are obtained in solution by adding enough water to bring the total volume up to 1250 gallons. This alcohol-water solution is filtered from the insolubles, freed from alcohol, and boiled down in vacuum. The residue of the boiling represents the gums derived from the grain together with a certain amount of dextrins. This extraction with an alcohol-water mixture can be repeated and finally the alcohol is driven out of the residue representing the feed part which later is mixed with the cakes which were obtained by running the original slop through the filter-presses, and this mixture of the solids of the original slop, and the said residue, is dried and used as an unimpaired cattle-feed.

The concentrated mixture of by-products contains lactic acid, succinic acid, glycerin, fat, some salts and impurities such as salts and nitrogenous substances as already explained. The fat easily separates from this mixture and can be skimmed off. The remaining mixture of by-products may be relieved of the largest part of the impurities by adding to it a mixture of alcohol and ether. By doing so more salts and nitrogenous substances are precipitated from the mixture of by-products. The remaining solution is drawn off from the insoluble part and again concentrated. The separation of the resulting mixture of by-products does not constitute a part of the present application but forms the subject of a divisional application.

The object of the present process as distinguished from the older ones is to recover a solution containing a plurality of by-products from the distillery-slop with the aid of solvents and the value of the by-products recovered by this process has been shown to be about three times as large as that recovered by the older ones.

Besides recovering a larger value of by-products the present process fully preserves the value of the residue of extraction as a feed and leaves the feed-residue richer in and containing a higher percentage of the most valuable feed-substances—the proteins.

The total value of by-products extracted and of the feed recovered is far in excess of the values that can be obtained by any older processes.

Having thus described my invention, I claim:—

1. The process of precipitating albumenous and gummy substances from undried distillery material, consisting in treating said material with an alcoholic solvent, and separating the solution resulting from such treatment from the insoluble part.

2. The process of recovering by-products from distillery refuse which consists in preparing from said refuse a concentrated material containing the by-products in an undried state, treating said material with an alcoholic solvent, and separating the solution resulting from this treatment from the insoluble part.

3. The process of recovering a solution containing a plurality of by-products from distillery-slop, consisting in evaporating slop to a syrupy consistency, mixing it afterward with an alcoholic solvent, and separating the solution of by-products resulting from this treatment from the insoluble part.

4. The process of recovering a solution containing a plurality of by-products and a feed from distillery-slop, consisting in evaporating slop to a syrupy consistency, mixing with the same an alcoholic solvent, separating the solution resulting from this treatment from the insoluble part, and recovering the solvent.

5. The process of recovering a solution containing a plurality of by-products and a feed from a mixture of substances derived from distillery-slop, consisting in treating said mixture of substances in a concentrated state with an alcoholic solvent, separating the solution resulting from this treatment from the insoluble part, and recovering the solvent.

6. The process of separating a mixture of substances derived from distillery slop into a feed and a solution containing lactic acid, succinic acid, glycerin and fat, consisting in treating said mixture of substances in a concentrated state with an alcoholic solvent, separating the solution resulting from this treatment from the residue, and recovering the solvent from the residue.

7. The process of separating the substances dissolved in distillery-slop into feed and into a solution containing lactic acid, succinic acid, glycerin and fat, consisting in separating slop into a solid part and a liquid part, removing water from the liquid part, treating this part afterward with an alcoholic solvent, separating the solution thus obtained from the residue, and recovering the solvent from the residue.

8. The process of separating the substances dissolved in distillery-slop into feed and into a solution containing lactic acid, succinic acid, glycerin and fat, consisting in separating slop into a solid part and into a liquid part, removing water from the liquid part, treating this part afterward with an alcoholic solvent, separating the solution thus obtained from the residue, and drying the residue.

9. The process of recovering from distillery-slop feed and a solution containing lactic acid, succinic acid, glycerin and fat, consisting in separating slop into a solid part and into a liquid part, removing water from the liquid part, treating the liquid part afterward with an alcoholic solvent, separating the solution thus obtained from the residue, recovering the solvent from the residue, mixing the residue with the solid part of the slop, and drying the mixture.

10. The process of separating distillery-slop into a solid residue and a solution containing lactic acid, succinic acid, glycerin, and fat, consisting in evaporating slop to a syrupy consistency, mixing the latter with an alcoholic solvent, separating the alcoholic solution from the residue, and recovering the solvent from the residue.

11. The process of separating from distillery-slop gums, dextrins, nitrogenous substances and salts and a feed, consisting in removing water from slop, treating the same with an alcoholic solvent, separating the solution thus obtained from the residue, treating the residue with alcohol-water-mixtures, and separating the alcohol-water-solution from the residue.

12. The process of separating from distillery-slop gums, dextrins, nitrogenous substances, and salts and a feed consisting in removing water from slop, treating the same with an alcoholic solvent, separating the solution thus obtained from the residue, treating the residue with alcohol-water mixtures, separating the alcohol-water-solution from the residue, and treating the residue with water.

13. The process of separating from distillery-slop, gums, dextrins, nitrogenous substances and salts and a feed, consisting in removing water from slop, treating the same with an alcoholic solvent, separating the solution thus obtained from the residue, treating the residue with water, and separating the new solution from the residue.

14. The process of separating from the liquid part of distillery-slop gums, dextrins nitrogenous substances and salts and a feed, consisting in separating slop into a solid part and a liquid part, evaporating the liquid part to a syrupy consistency, treating the liquid part afterward with an alcoholic solvent, separating the solution thus obtained from the residue, treating the residue with alcohol-water-mixtures, and separating the alcohol-water solution from the residue.

15. The process of recovering a solution containing lactic acid, succinic acid, glycerin, soluble nitrogenous substances, salts and fat, and another solution containing gums, dextrins, nitrogenous substances, salts, and a feed from a mixture of substances derived from distillery slop, consisting in treating said mixture of substances with an alcoholic solvent thereby separating said mixture of substances into a solution containing lactic acid, succinic acid, glycerin, fat, nitrogenous substances and salts soluble in said solvent, and a residue, treating the residue with alcohol-water-mixtures thereby separating said residue into a solution containing gums, dextrins, soluble nitrogenous substances and salts, and into a new residue, and recovering the solvent from the new residue.

16. In the process of recovering a plurality of by-products from distillery-slop, the process which consists in removing water from slop, treating the latter with an alcoholic solvent, separating the solution thus obtained from the residue concentrating the solution by evaporating the solvent, treating the resulting mixture of by-products with an alcoholic solvent, and separating this solution from the new residue.

17. The process of separating a mixture of substances derived from distillery-slop into a plurality of groups of by-products, consisting in mixing said substances with an alcoholic solvent in a continuous manner, and separating the resulting solution from the insoluble residue in a continuous manner.

18. The process of recovering by-products from distillery-refuse which consists in preparing from said refuse a concentrated material containing the products in an undried state, treating said material with an alcoholic solvent, separating the resulting solution from the residue in a continuous manner and continuously recovering the solvent.

In testimony whereof I affix my signature, in presence of two witnesses.

ALADÁR von LÁSZLOFFY.

Witnesses:
  CHAS. B. McDOUGAL,
  A. C. BURKHARDT.